(12) United States Patent
Rayman

(10) Patent No.: US 6,561,241 B2
(45) Date of Patent: May 13, 2003

(54) TWO PIECE TIRE WITH IMPROVED TIRE TREAD BELT AND CARCASS

(75) Inventor: William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 142 days.

(21) Appl. No.: 09/840,385

(22) Filed: Apr. 23, 2001

(65) Prior Publication Data

US 2002/0153079 A1 Oct. 24, 2002

(51) Int. Cl.$^7$ ............. B60C 11/02; B60C 11/00; B60C 9/18
(52) U.S. Cl. ............ 152/209.1; 152/209.6; 152/209.14; 152/454; 152/526; 152/531; 152/538
(58) Field of Search ............ 152/209.1, 209.6, 152/209.14, 526, 531, 535, 538, 454; 156/128.1

(56) References Cited

U.S. PATENT DOCUMENTS

| | | |
|---|---|---|
| 1,013,596 A | 1/1912 | Freschl |
| 2,609,026 A | 9/1952 | Luchsinger-Caballero .. 152/176 |
| 3,450,182 A | 6/1969 | Verdier ........................ 152/352 |
| 3,474,848 A * | 10/1969 | Maiocchi .................... 152/176 |
| 3,667,527 A * | 6/1972 | Magistrini et al. .......... 152/176 |
| 3,719,219 A | 3/1973 | Horvath et al. ............. 152/379 |
| 3,750,733 A | 8/1973 | Brewer et al. .............. 152/175 |
| 3,773,394 A | 11/1973 | Grawey ....................... 305/38 |
| 3,897,814 A | 8/1975 | Grawey ................... 152/361 R |
| 3,970,493 A | 7/1976 | Grawey ........................ 156/96 |
| 4,043,609 A | 8/1977 | Vidakovic et al. ............ 305/19 |
| 4,050,495 A | 9/1977 | Olsen ........................ 152/187 |
| 4,057,302 A | 11/1977 | Caravito ...................... 305/19 |
| 4,059,313 A | 11/1977 | Beyers et al. ................. 305/19 |
| 4,070,071 A | 1/1978 | Caravito ...................... 305/13 |
| 4,071,068 A | 1/1978 | Olsen ........................ 152/176 |
| 4,081,013 A | 3/1978 | Herman ...................... 152/179 |
| 4,096,900 A | 6/1978 | Olsen .................... 152/354 R |
| 4,258,768 A | 3/1981 | Pamer et al. ............... 152/176 |
| 4,306,603 A | 12/1981 | Dighe et al. ................ 152/222 |
| 4,328,849 A | 5/1982 | Dighe et al. ................ 152/176 |
| 4,351,380 A | 9/1982 | Pilliod, Jr. et al. .......... 152/169 |
| 4,480,670 A | 11/1984 | Payne ........................ 152/169 |

FOREIGN PATENT DOCUMENTS

| | | | | |
|---|---|---|---|---|
| DE | 38 18 567 | | 12/1989 | .......... B60C/11/02 |
| GB | 1200001 | * | 7/1970 | |
| WO | WO 98/52776 | | 11/1998 | .......... B60C/11/02 |

* cited by examiner

*Primary Examiner*—Michael W. Ball
*Assistant Examiner*—Justin Fischer
(74) *Attorney, Agent, or Firm*—David L. King

(57) ABSTRACT

A two-piece tire assembly has a removable tread belt 12 for installing about the circumference of a tire carcass 14. The tread belt has a pair of lateral ends each axially extending beyond the inflated unloaded carcass 14 at the circumferential surface by a distance of at least 4% of the width as measured at the tread belt 12 and carcass 14 interface. The carcass 14 has an abrasion resistant rubber layer 82 at the tread belt interface. The tread belt 12 also has the abrasion resistance tread compound 82 at the carcass 14 interface.

2 Claims, 3 Drawing Sheets

TWO PIECE TIRE WITH IMPROVED TIRE TREAD BELT AND CARCASS

RELATED APPLICATIONS

This patent application is an improvement over and is related to U.S. patent application Ser. No. 09/424,089, filed May 20, 1997, which is incorporated herein by reference.

TECHNICAL FIELD

This invention relates to pneumatic tires with tread belts and more particularly to an improved removable tread belt pneumatic tire constructed of a removable tread belt mounted on a radially reinforced beaded tire carcass that is typically for use with earthmoving vehicles.

BACKGROUND OF THE INVENTION

The tread belt pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art tread belt tire assemblies comprise a plurality of ground-engaging shoes spaced about the periphery of the supporting structure. The heavy loads on the shoes result in great stresses being developed that sometimes lead to premature tire failure. The U.S. Pat. No. 4,351,380 patent is directed to an improved track belt assembly which comprise a plurality of shoes spaced about the periphery of a load-supporting structure and secured to a reinforcing belt structure disposed on the side of the shoe opposite the ground-engaging side thereof The large pneumatic tires, which are typically used for earthmoving vehicles, sometimes fail due to the high stress and loads caused by the harsh environmental conditions in which they are operated. These large prior art pneumatic tires had a greater tendency to fail in one of three tire locations or areas. The first problem area was that the turn-up end of the ply would sometimes break through the sidewall of the tire. A second problem area was a tire failure in the bead area. The third problem area was a tendency to fail in the crown and/or shoulder area of the tire.

In the prior art, conventional solutions to these problems include increasing the gauge of the sidewall to increase the bending stiffness, increasing bead area stiffness and robustness, and decreasing tire deformation under load by increasing the sidewall stiffness. To further improve tire durability, the ply turn-up portion of tires was typically reinforced.

In U.S. Pat. No. 4,609,023, having a common assignee with the present invention, the sidewall inserts were incorporated in the tire carcass to allow the ply structure to conform to its natural shape when the tire is inflated.

The most relevant prior art patent, U.S. Pat. No. 4,050,495, issued Sep. 27, 1977, teaches the use of a removable tread belt installed as an annular belt about the circumference of a tire carcass. The tread belt included laterally extending bars encapsulated in a matrix of rubber. The ends of the bars extended outwardly to a point beyond the widest portion of the carcass sidewall. The tread belt was rigidly supported by the bars at the ends of the tread belt to prevent deflection of the overhanging and otherwise unsupported tread belt at the lateral ends.

With the continual drive to improve earthmover performance, there is a continuing need to provide novel methods and tire designs for improving earthmover tire durability. The present invention is directed to an improved pneumatic tire and removable tread belt assembly with which the frequency of premature tire failure is thought to be substantially reduced. The present invention is also directed to providing an improved pneumatic tire and tread belt assembly which is designed to allow large tires to be transported in several sections and then assembled at the construction site to ease the otherwise difficult problem of transporting the large tires, i.e. sometimes over 13 feet in height and approximately 8,000 to 15,000 pounds. Moreover, the present invention relates to an improved pneumatic tire and removable tread belt assembly with which the driving characteristics of the tire can be more economically changed and the inventory of the number of tire spares that are typically needed can be reduced.

OBJECTS AND SUMMARY OF THE INVENTION

It is an object of the present invention to provide a pneumatic tire for an earthmover vehicle, the pneumatic tire being as defined in one or more of the appended claims and, as such, having the capability of being constructed to accomplish one or more of the following subsidiary objects.

It is another object of the present invention to provide an improved tire and removable tread belt assembly for an earthmover vehicle wherein the frequency of premature tire failure has been substantially reduced.

Another object of the present invention is directed to providing an improved tire and removable tread belt assembly which is designed to allow large tires to be transported in several sections and then assembled at the delivery site.

Still another object of the present invention is to provide an improved tire and removable tread belt assembly with which the driving characteristics of the tire can be quickly and economically changed.

Yet another object of the present invention is to provide an improved tire and removable tread belt assembly with which the number of tire spares that are stored in inventory can be reduced.

Still another object of the present invention is to provide an improved tire and removable tread belt assembly with a unique tread belt that is restrained from expanding radially outwardly.

A further object of the present invention is to provide an improved tire and removable tread belt assembly wherein the tire treads will maintain a more flat tread profile which will improve tread life and durability.

A still further object of the present invention is to provide an improved tire and removable tread belt assembly wherein the belt is constructed to provide penetration protection.

In accordance with an embodiment of the invention a two-piece tire assembly is disclosed. The two-piece tire assembly has a removable tread belt for installing about the circumference of a tire carcass and a tire carcass having an inflated and unloaded outer circumferential surface having an axial dimension no greater than the axial width of the removable tread belt.

The tread belt has a pair of lateral ends each axially extending beyond the inflated unloaded carcass at the circumferential surface by a distance of at least 4% of carcass width as measured at the tread belt and carcass interface, and wherein the tread belt width is at least equal to or wider than the loaded deflected carcass width as measured at the outer circumferential surface of the carcass.

Each lateral end of the tread belt has a plurality of circumferentially extending substantially zero degree oriented cords in a first reinforcement layer and is radially inwardly flexible under load.

The tread belt preferably has a radially outer surface having a substantially flat tread arc radius $R_1$ between the lateral ends extending from 50% to 75% of the tread belt axial width and a smaller tread arc radius $R_2$ extending from each of the lateral ends to the first tread arc $R_1$, the radially outer tread surface having a sloping surface extending from a tangency to $R_2$ to a lateral end. The radial difference in the tread belt surface as measured at the centerline of the tread belt and each lateral end of the removable tread belt is about approximately 3 to 8% of the outside diameter as measured at the centerline of the tread belt.

The tread belt has a belt reinforcing structure radially outward of the circumferentially extending cords in the first reinforcement layer. The belt reinforcing structure has a pair of cross-plies and a radially outer ply having cords oriented substantially 90 relative to the circumferentially extending cords in a first reinforcement layer.

DEFINITIONS

Figure 1:
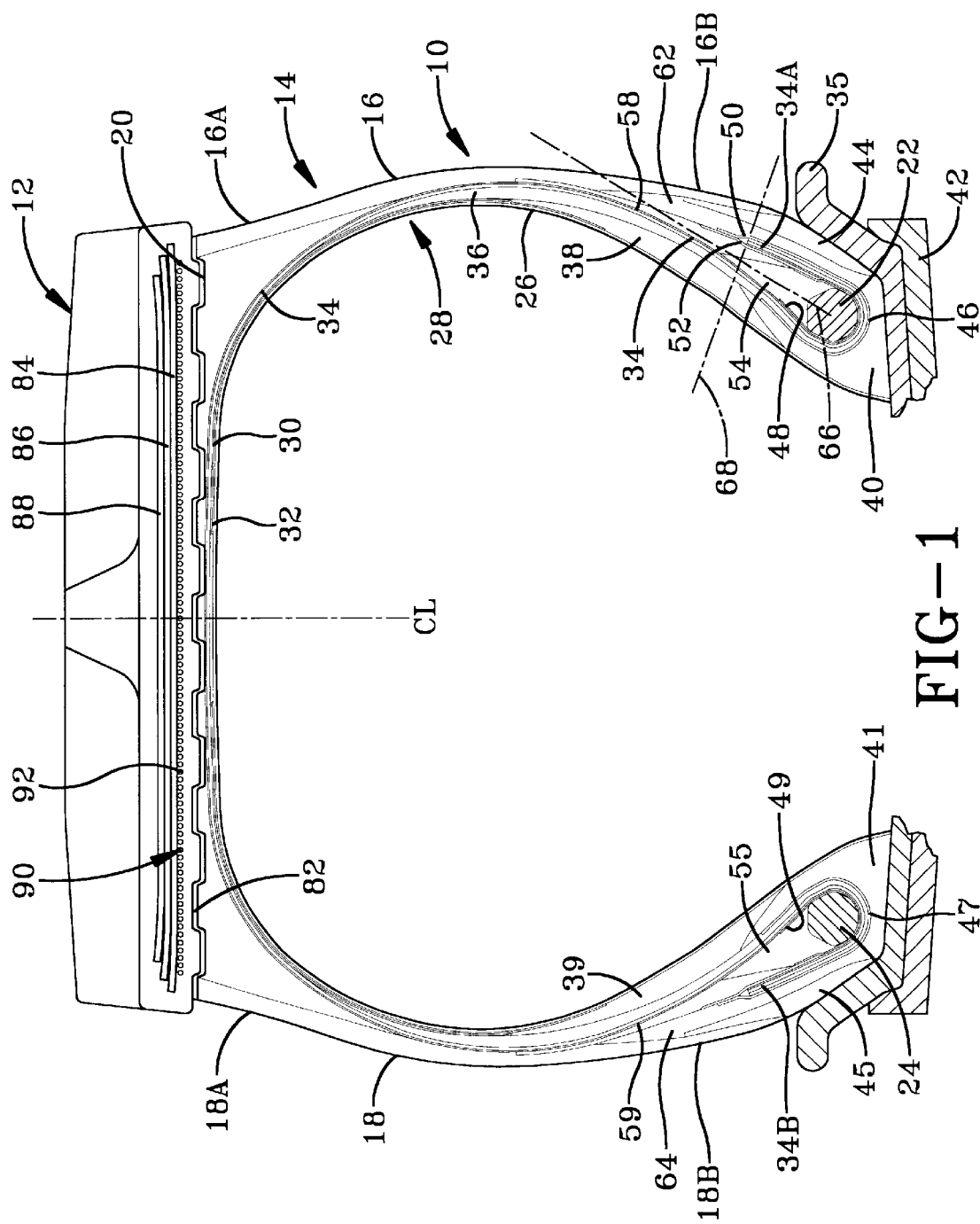
FIG. 1 is a cross-sectional view illustrating the two-piece tire with a removable tire tread belt mounted on an inflatable tire carcass and made in accordance with the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 75° with respect to the equatorial plane of the tire.

"Bias ply tire" means a tire having a carcass with reinforcing cords in the carcass ply extending diagonally across the tire from bead core to bead core at about 25–50 angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a belted or circumferentially-restricted pneumatic tire in which the ply cords which extend from bead to bead are laid at cord angles between 65 and 90 with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of a two-piece pneumatic tire 10 which in the specific exemplary embodiment illustrated is a size 33.00R51 earthmover tire. At an inflation pressure of 102 psi the size 33.00R51 tire has a 119.9 inch (303 cm) maximum inflated outside diameter, a 37.2 inch (94 cm) maximum inflated width tire in the axial directions, and a nominal bead diameter of 51.00 inches (130 cm). The tires are typically inflated to a pressure of about 100 pounds per square inch (psi) with air and sometimes with an air/nitrogen mixture.

The improved tread belt pneumatic tire 10 includes a ground engaging, circumferentially extending tread belt 12 mounted on a radially reinforced, beaded tire carcass 14. The beaded tire carcass 14 generally includes a pair of tire sidewalls 16,18 extending radially inwardly from the outer circumferential surface 20 of the tire carcass and terminating at their radial extremities in a pair of bead wires 22,24, respectively. The sidewalls 16, 18 each have an upper portion 16a, 118a, respectively, in the shoulder region of tire carcass 14 and radially inward of the maximum section width of the tire carcass, and a lower portion 16b, 18b, respectively, adjacent the bead wires 22, 24, respectively, and radially inward of the maximum section width of the tire carcass 14. The details of the construction of tire carcass 14 are described in detail hereinafter.

Tire Carcass

Figure 2:
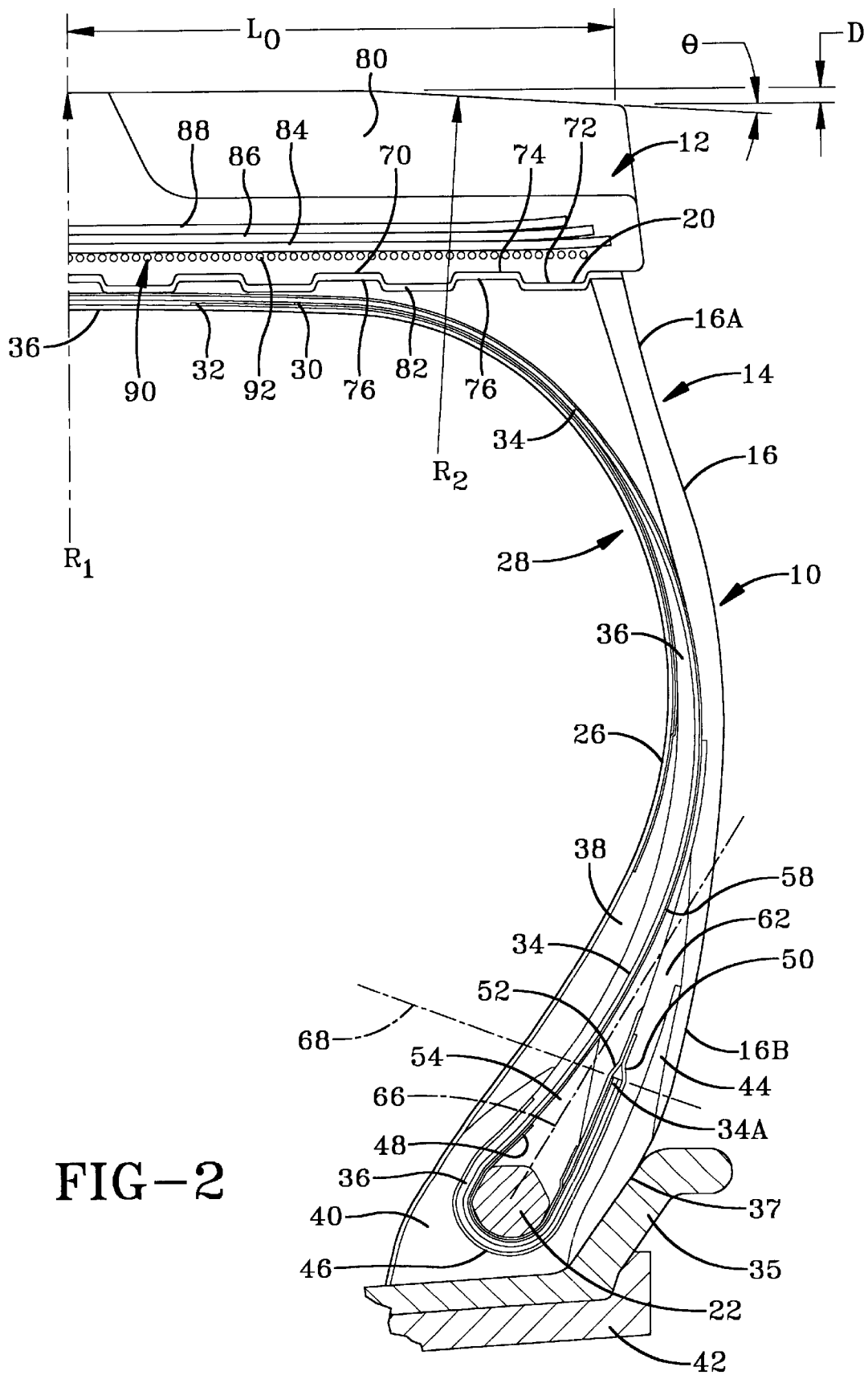
FIG. 2 is an enlarged, cross-sectional view illustrating one side or half of the symmetrical tire shown in FIG. 1 and made in accordance with the present invention.

Referring FIGS. 1 and 2, the details of tire carcass 14 are illustrated. The axially inward surface 28 is an inner ply liner 26 which forms an innerliner that holds the air pressure for inflating tire 10. The inner ply liner 26 covers the entire interior facing surface 28 of the tire carcass 14 and serves to hold the air within the carcass that is used to inflate tire 10. Fabric barrier plies 30 and 32 are provided within the tire carcass 12 in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between zero and four barrier plies, as needed for a specific design.

The carcass 14 also includes in its construction at least one rubberized laminated ply layer 34 of tire cord fabric which extends radially inwardly from the outer circumferential surface 20 of the tire carcass, also called the crown area of the tire carcass, and has turnup ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material.

At the radially outermost portion of the carcass 14 there is a thin layer of abrasion resistant tread compound 82. The abrasion resistant tread compound 82 forms a tough durable long wearing surface between the tread belt 12 and the carcass 14. The use of tread rubber is an ideal material because it is adapted to form grooves and ridges or as shown in FIGS. 1 and 2, the lands 76 and grooves 78, which are used to retain the belts. Preferably the tread compound 82 is identical to the rubber compound used in the tread belt 12, which is also a generally commercially available rubber blend.

Between the innerliner 26 and the ply layer 34 is a barrier rubber layer 36 which backs up the entire length of ply layer 34 and is formed of a soft compound of rubber which squeezes against the ply layer 34. Annular stiffeners, known as apexes or apex elements 38,39 herein, each having a generally triangular shape are provided radially outward of the bead wires 22,24, respectively, and between the barrier rubber 36 and the innerliner 26. The apexes 38,39 extend from approximately the mid-sidewall and the area of innerliner 26 radially outward from the bead wires 22, 24, respectively, for stiffening the bead area to help prevent the tire from bending over the flange 35. Axially outward from apexes 38,39 and between the ply layer 34 where it turns up about bead wires 22,24 are located lower gum chafers 40, 41, respectively, that support the bead wires 22, 24, respectively, in the area of the wheel mounting rim 42 and to prevent chafing of the tire by an adjacent wheel mounting rim. Upper gum chafers 44, 45 are disposed against the lower gum chafers 40, 41, respectively, and the lower tire sidewalls 16b, 18b, respectively, to provide support for the bead wires 22, 24 in the area of the flange 35 and to prevent chafing of the tire by an adjacent wheel mounting rim.

Between the lower chafers 40, 41 and the rubber barrier 36 in the area partially surrounding bead wires 22, 24 are located fabric or wire chafer plies 46, 47 that support the bead wires 22, 24, respectively. As best seen in FIGS. 2 and 2A, the chafer plies 46 are primarily disposed against the inner facing surfaces of lower chafers 40, 41. Between the inner surface of ply layer 34 and the bead wires 22 and 24 are located flippers 48, 49, respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b, respectively, of ply 34 and enable the movement of ply 34 between the gum layers and 52 without exposing the wire within ply 34 during tire construction or severe bending of the tire.

Apex Configuration

Two annular stiffeners, referred to as apexes 54, 55 herein, each having a generally four sided shape, are provide radially outward of the bead wires 22,24, respectively, between flippers 48,49, and out to apexes 58, 59, for stiffening the area about the bead wires 22, 24, respectively, to help prevent the tire from bending over the flange 35. The apexes 54, 55 are further disposed between the lower inner end of rubberized ply layer 34 and the turn-up ends 34a and 34b. Abutted against and extending radially outward from the apexes 54 and 55 are two annular stiffeners, referred to herein as apexes 58 and 59, respectively, which help support the ends 34a and 34b of rubberized ply layer 34. The apexes 54, 55, are constructed of a relatively hard compound having a modulus of about 12.2–14.9 megapascals/cm$^2$ at 200% elongation. Axially outward from the apexes 58 and 59 are the outer apexes 62 and 64, respectively. The apexes 38, 39, 58, 59, and 62, 64 are generally constructed of the same relatively soft rubber compound having a modulus of about 7.2–8.8 megapascals/cm$^2$ at 200% elongation and act to provide a soft cushion that absorbs the stresses around the turn up ends 34a and 34b of the ply layer 34 which is caused by stress forces generated by the flexing of the tire. While the apexes 38, 39, 58, 59, and 62, 64 are typically constructed of the same rubber compound, it is within the terms of the invention to construct one or more of the apexes with a different modulus within the range of between about 7.2 and 8.8 megapascals/cm$^2$ at 200%. In the preferred embodiment, the apexes 38, 39, 58, 60, 62 and 64 are softer than the apexes 54 and 55 which are located directly adjacent and radially outward from the bead wires 22 and 24, respectively. Preferably the rubber compound used to form the apexes 54 and 55 are about 20% to about 50%, and preferably about 20% to about 50% stiffer than the rubber compound used to form apexes 38, 39, 58, 59, 62 and 64.

Figure 3:
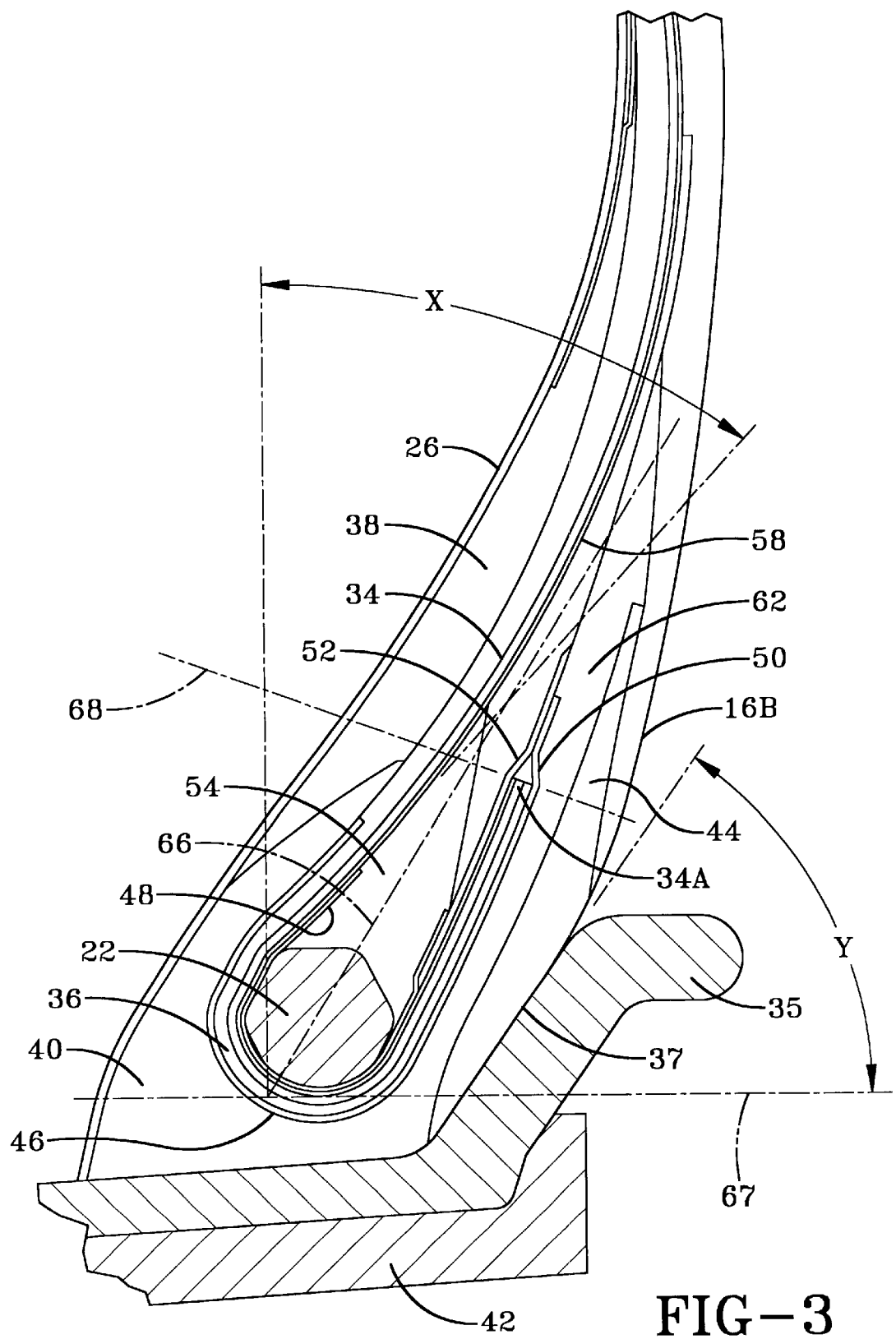
FIG. 3 is an enlarged, cross-sectional view illustrating the bead area of the tire shown in FIG. 2.

The location of the ply turn-up ends 34a and 34b are an important aspect of the carcass design. As best illustrated in FIG. 3, preferably the turn-up ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turn-up ends 34a, 34b of ply layer 34 is important in that it can withstand the pressure exerted against the ply end, which was sometimes sufficient to cause the ply end to break through the sidewall in prior art constructions where the turn-up ends extend closer to the center of the tire sidewalls. The advantage of having the outer ends of the turn-up ends 34a, 34b of carcass ply 34 at a lower position closer to the radial outward portion of the flange 35 is so that when operating conditions cause the tire to deflect outwards, the ends of turn-up ends 34a, 34b of the ply layer 34 will be supported by flange 35. This arrangement will greatly reduce the possibility that the outer ends of turn-up ends 34a, 34b will be the cause of a crack in or penetrate axially outward through the sidewall of the tire carcass 14.

The ply line of ply layer 34 follows the natural ply line, which means it is already at its natural shape upon inflation. The carcass ply 34 retains its natural shape when inflated to reduce the inflation strain on the tire. The portion of the ply cord extending down to the bead 22 is equally supported along its length by the axially interior surface 37 of the rim flange 35 which is substantially parallel to the centerline 66 passing though beads 22, 24.

Tread Belt

The ground engaging, circumferentially extending tread belt 12 is removably mounted onto the tire carcass 14. As best shown in FIG. 2, the underside or inner circumference surface 70 of tread belt 12 comprises a plurality of annular lands 72 and grooves 74 that mate with lands 76 and grooves 78 of tire carcass 14 to restrain belt 12 from lateral or axial movement with respect to the carcass 14. The tire tread belt 12 includes a tread portion 80 and a plurality of tread belts 84, 86, and 88 (84–88). A radially inner belt layer 84 and 86 have cords of steel having a core strand surrounded by sheath strands. The core strand preferably has a plurality of three filaments forming the core. The wire construction is as described in co-pending application Ser. No. 09/507,316, filed Feb. 18, 2000, entitled STEEL CORD FOR REINFORCING ELASTOMERIC ARTICLES which is incorporated by reference herein in its entirety. Each tread belt layer 84, 86 has the cords oriented at an angle of 15° to 80° relative to the circumferential direction and spaced at 4 ends per inch. These adjacent layers 84, 86 being equal but oppositely oriented.

The radially outermost third layer 88 has the steel cords oriented at 90° relative to the circumferential direction. This in combination with the belt layers 84, 86 creates a very strong construction. Radially inward of these belt reinforcement layers is a unique first reinforcement layer 90 having cords 92 oriented 0° relative to the circumferential direction, preferably spaced at 3 EPI.

While three tread belts 84–88 are illustrated, it is within the scope of the invention to use other numbers of tread belt layers as needed. The combination of a removable tire tread belt 12 with a tire carcass 14 for use with large earthmoving vehicles is important in that it enables a portion of a tire 10 to be replaced instead of the entire tire in the event that one portion of the tire, i.e., the tire belt 12 or the tire carcass 14, wears out before the other part. Also, it may be desirable to have different types of tread designs such as, for example, driving or steering tread designs. This feature allows for a less expensive means of changing the tire tread to construct the appropriate style of desired tire. This feature would greatly reduce the cost of storing spare tires and could even extend the operating time of the tires.

A unique aspect of the present invention is the provision of zero degree wires 92 in the first reinforcement layer 90. The zero degree wires in layer 90 encircle the tire tread belt 12 and are provided to restrict the radially outward growth of the tread belt 12 due to a serious deflection in the tire carcass. By keeping the tire tread belt 12 from expanding radially outward, the tire's tread will maintain a more flat tread profile which will improve tread life and durability. The zero degree 92 wires in first reinforcement layer 90 eliminate the need for a larger number of belt layers.

With particular reference to the first reinforcement layer 90 it is believed most beneficial to have the axially outermost cords 92 axially inward of the lateral ends of the belt layers 84 and 86. As shown the lateral ends of the belt layer 84 overhang the adjacent first reinforcement layer 90 and project axially outward from the lateral ends of belt layer 86. By insuring the belt layers 84 and 86 overhang or extend beyond the zero degree cords 92 of the first reinforcement layer 90 provides added protection against cut damage of the cords 92. As can be easily appreciated as a large sharp rock is rolled over in the path of the tread belt, the lateral ends of the tread belt can deflect and the belt layers 84, 86 by overhanging actually can bend over the zero degree cords 92 stopping the rock from cutting those cords.

The primary advantage of the tread belt design in the region of the lateral edges is the fact that the lateral edge portions of the tread belt 12 at the surface adjoining the circumferentially outer surface of the carcass 14 extend beyond the carcass 14 as shown at the interface 20 of the tread belt 12 and the carcass 14. This increases the flexibility of the tread belt 12 and improves the handling characteristics of the tire 10. The outer surface of the tread has an inclination of θ, θ being about 4° slope in the lateral portions of the tread and is flat or 0° sloped in the central region. The flat shaped central region extends at least 50% of the total tread width. In the 31.00R51 design, the central portion extends over 9.00 inches and each lateral portion extends from the central portion 25% or less of the total tread width, or about 7.00 inches in the 31.00R51 tire size of the preferred embodiment tire.

This transition of the tread surface in the region $L_o$ from sloping flat 0° to a 4° radially inward slope creates a shoulder drop-off (D) of at least 10 mm. This feature lowers the tread belt 12 contact pressure in the lateral portions and this generally reduces the shoulder wear particularly in the steering wheel positions. An added benefit is noted in that the deflection of the lateral portion is enhanced by a reduction in the radial height of the tread created by the shoulder drop-off (D). This means that the thinner tread at the lateral ends is easier to deflect radially outwardly but almost paradoxically the amount of inward pressuring trying to deflect inwardly the tread edge is lowered by the sloping shoulder. In combination this insures that while the tread belt is deliberately made flexible at the lateral edge to accommodate large stones and rock, preferably, the entire central region of the tread has even footprint pressures at the crown wherein the tread is fully supported. Ideally, the footprint pressure at the shoulders of the tread are equal to, or slightly less than, the central region.

At the interface between the carcass 14 and the tread belt 12 it is believed important that the tread belt 12 overhangs the inflated and unloaded carcass by an amount of at least 15 mm or 4% of the carcass width as measured at the interface 20. As the tire 10 is placed under normal load the carcass 14 expands radially outwardly to a location almost aligned with the lateral end of the tread belt 12. It is believed undesirable to have the carcass 14 at the tread belt 12 interface to be extending laterally outward of the tread belt 12. The subtle relative movement of the tread belt 12 to the carcass 14 means that to insure the carcass 14 is not exposed requires the tread belt 12 to actually overhang the carcass 14 at the interface. While large amounts of overhang may be feasible it is considered inefficient to allow the tread belt 12 to extend beyond the maximum section width of the carcass. This is true for several reasons, first being each 1 inch of axial tread belt width on large sized tires such as 31.00R51 tire weighs approximately 100 lbs., secondarily the tread thickness is about 5.00 inches or greater and the distance to a location of the maximum section width of the carcass is another 24 inches meaning the rocks and debris most likely to damage the carcass 14 will strike at the tread belt interface. Rocks 30 inches or greater simply are too unlikely to be traversable in the quarry and therefore create no realistic threat to carcass damage, thirdly because the present invention has the lateral edges to be of a reduced stiffness to facilitate some degree of deflection radially inwardly, too large of an overhang could lead to flexure fatigue in the first reinforcement layer 90 requiring stiffening of the tread belt as was done in the prior art patent U.S. Pat. No. 4,050,495.

It is apparent that there has been provided in accordance with this invention apparatus and methods for constructing an improved tire 10 and removable tread belt assembly wherein the tire durability has been substantially increased by the inclusion of an improved apex construction. The improved tire and removable track belt assembly allow large tires to be transported in several sections and then assembled at the delivery site. Further, the removable tread belt assembly allows a different tread belt 12 to be applied to a tire carcass 14 so as to alter the driving characteristics of the tire quickly and economically.

What is claimed is:

1. A two-piece tire assembly having a removable tread belt for installing about the circumference of a tire carcass and a tire carcass having an inflated and unloaded outer circumferential surface as measured at the tread belt and carcass interface and having an axial dimension no greater than the axial width of the removable tread belt, the two-piece tire assembly being characterized by:

the tread belt having a pair of lateral ends each axially extending beyond the inflated unloaded carcass at the outer circumferential surface of the carcass by a distance of at least 4% of carcass width as measured at the tread belt and carcass interface and wherein the tread belt width is at least equal to or wider than the loaded deflected carcass width as measured at the outer circumference of the carcass, each lateral end of the tread belt having a plurality of circumferentially extending cords in a first reinforcement layer and being radially inwardly flexible under load, and wherein the removable tread belt has a radially outer surface having a substantially flat tread arc radius $R_1$ between the lateral ends extending from 50% to 75% of the tread belt axial width and a smaller tread arc radius $R_2$ extending from the first tread arc $R_1$, the tread outer surface having a sloping surface extending from a tangency to $R_2$ to a lateral end, the radial difference in the tread belt surface as measured at the centerline of the tread belt and each lateral end of the removable tread belt being about 3 to 8 percent of the outside diameter as measured by the centerline of the tread belt.

2. A two-piece tire assembly having a removable tread belt for installing about the circumference of a tire carcass and a tire carcass having an inflated and unloaded outer circumferential surface as measured at the tread belt and carcass interface and having an axial dimension no greater than the axial width of the removable tread belt, the two-piece tire assembly being characterized by:

the tread belt having a pair of lateral ends each axially extending beyond the inflated unloaded carcass at the outer circumferential surface of the carcass by a distance of at least 4% of carcass width as measured at the tread belt and carcass interface and wherein the tread belt width is at least equal to or wider than the loaded deflected carcass width as measured at the outer circumference of the carcass, each lateral end of the tread belt having a plurality of circumferentially extending cords in a first reinforcement layer and being radially inwardly flexible under load and wherein the removable tread belt has a belt reinforcing structure radially outward of the circumferentially extending cords in the first reinforcement layer, the belt reinforcing structure having a pair of cross-plies and a radially outer ply having cords oriented substantially 90° relative to the circumferentially extending cords in a first reinforcement layer.

* * * * *